United States Patent [19]

Stevens

[11] Patent Number: 5,481,441
[45] Date of Patent: Jan. 2, 1996

[54] ADJUSTABLE LIGHT BAR APPARATUS

[76] Inventor: Daniel W. Stevens, 2901 W. Belmont, Phoenix, Ariz. 85051

[21] Appl. No.: 112,964

[22] Filed: Sep. 20, 1993

[51] Int. Cl.[6] .................................................. B60Q 1/00
[52] U.S. Cl. .......................... 362/35; 362/70; 362/232; 362/250; 362/286; 362/289; 362/386; 362/418; 362/427; 74/89.15; 74/665 G
[58] Field of Search ............................. 362/35, 70, 232, 362/238, 250, 286, 287, 289, 386, 418, 427; 74/89.15, 665 G

[56] References Cited

U.S. PATENT DOCUMENTS

| | | |
|---|---|---|
| 1,332,903 | 3/1920 | Jones et al. . |
| 1,544,859 | 7/1925 | Pierce . |
| 1,652,738 | 12/1927 | Seitz . |
| 1,666,856 | 4/1928 | Holliday . |
| 1,697,242 | 1/1929 | Hill . |
| 2,603,898 | 7/1952 | Patterson, Jr. . |
| 3,063,298 | 11/1962 | Elliott ................................ 74/89.15 |
| 4,240,062 | 12/1980 | Gosswiller . |
| 4,344,117 | 8/1982 | Niccum ..................................... 362/35 |
| 4,626,966 | 12/1986 | Bleiwas et al. . |
| 4,692,845 | 9/1987 | Widhalm et al. . |
| 4,707,014 | 11/1987 | Rich . |
| 4,722,030 | 1/1988 | Bowden ................................. 362/287 |
| 4,928,216 | 5/1990 | Carr ....................................... 362/250 |

FOREIGN PATENT DOCUMENTS 354697  2/1930  United Kingdom .................. 362/418

Primary Examiner—Ira S. Lazarus
Assistant Examiner—Sara Sachie Raab
Attorney, Agent, or Firm—H. Gordon Shields

[57] ABSTRACT

Light bar apparatus includes a light bar or housing supported at opposite ends, and within the light bar or housing are appropriate gears and a chain connected to and for rotating a plurality of lights extending upwardly from the light bar. The lights rotate relative to the light bar. An electric motor connected to the gears and the drive chain within the light bar causes rotation of the lights. The light bar itself tilts or pivots vertically relative to the end supports through a mechanical linkage which includes a chain drive coupled to an electric gear motor.

10 Claims, 3 Drawing Sheets

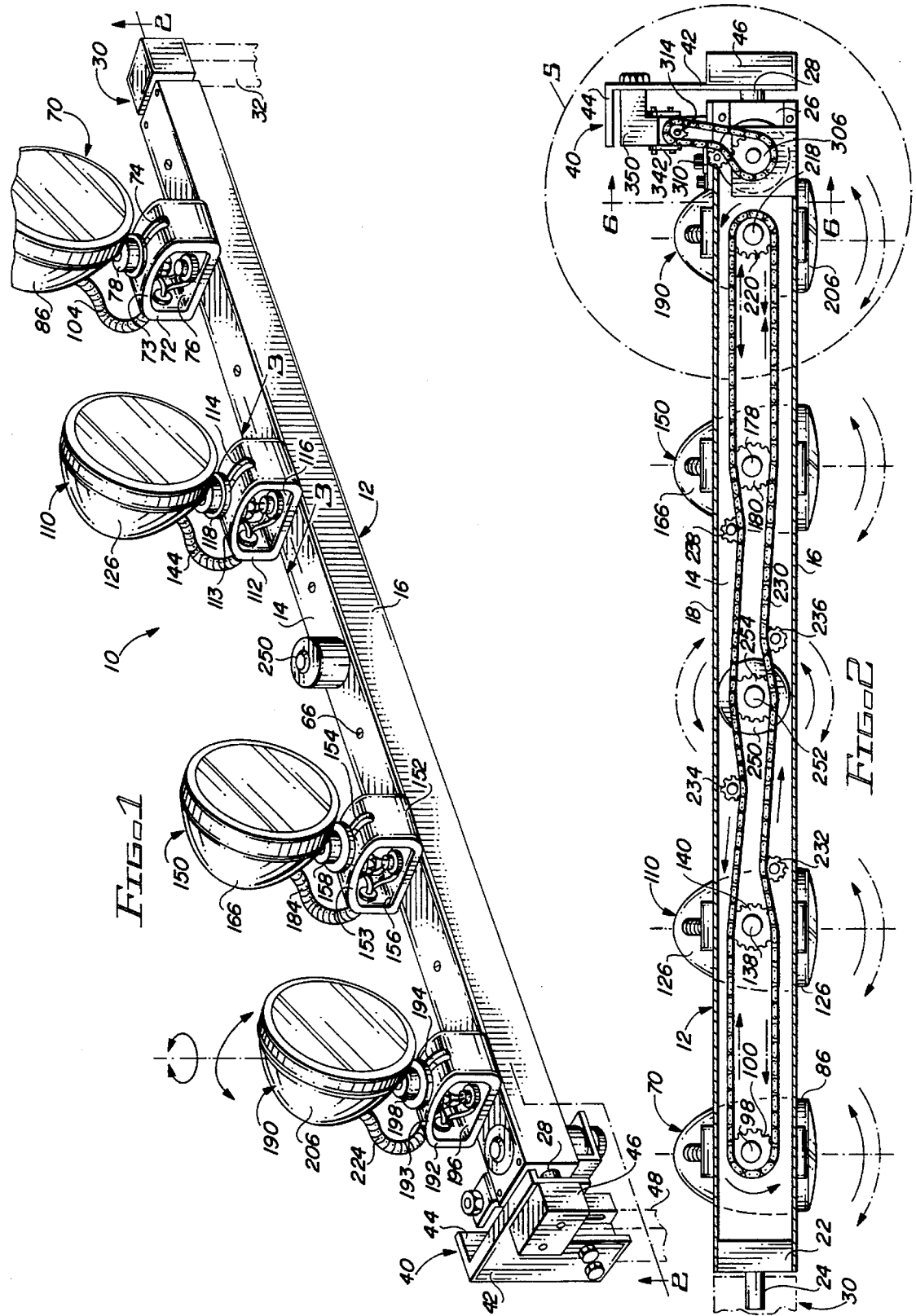

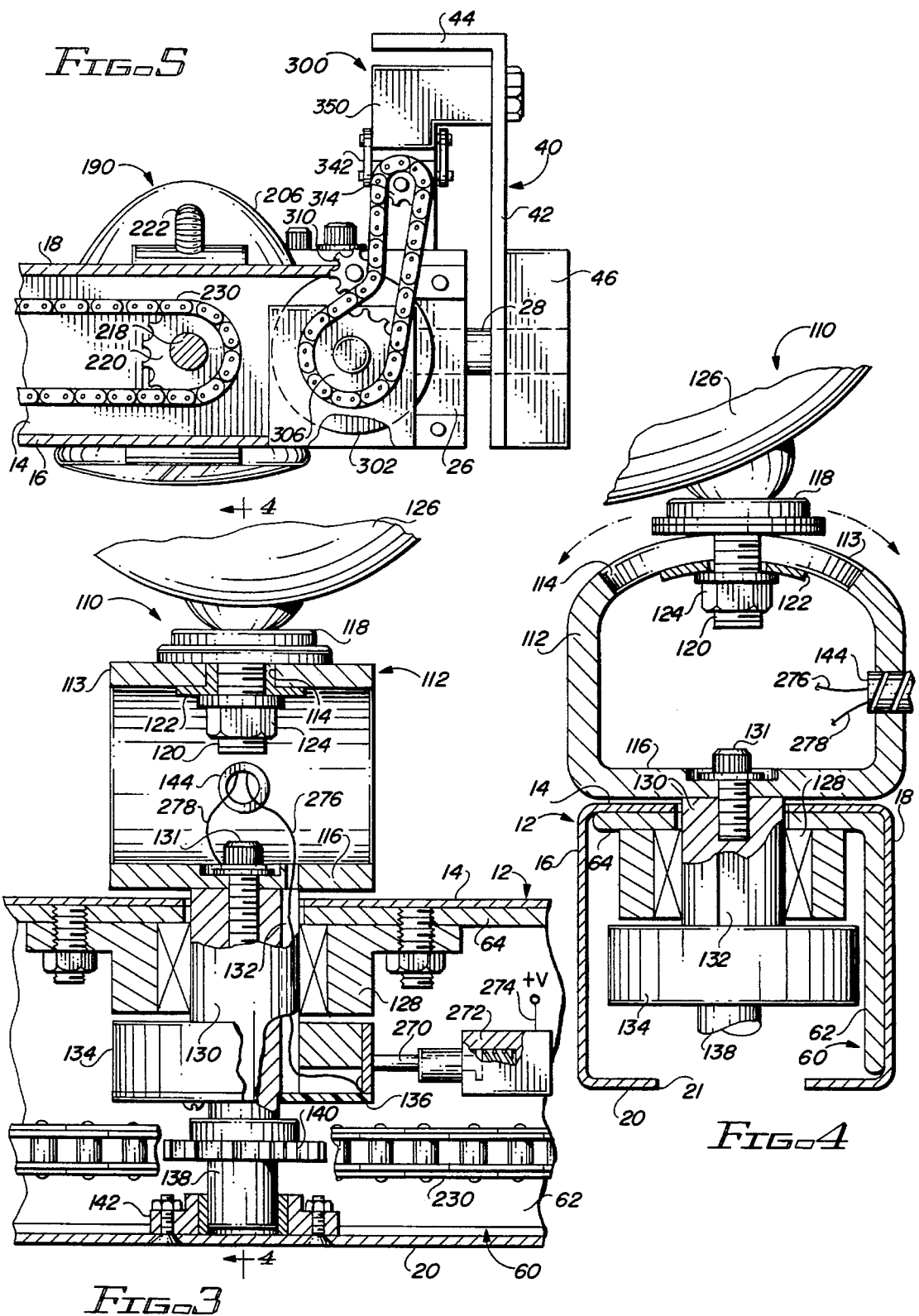

ADJUSTABLE LIGHT BAR APPARATUS

BACKGROUND OF THE INVENTION

1. Field of the Invention

This invention relates to light bars adapted to be disposed on the top of vehicles and, more particularly, to light bars which include movable lights.

2. Description of the Prior Art

U.S. Pat. No. 1,332,903 (Jones et al) discloses a chain drive system used to rotate headlights of a vehicle. Movement of the chain is coupled to a lever on the steering column of the vehicle.

U.S. Pat. No. 1,544,859 (Pierce) discloses a tilting headlight system in which a mechanical linkage is used to tilt the headlights.

U.S. Pat. No. 1,652,738 (Seitz) discloses an adjustable system in which a mechanical linkage is used to rotate headlights. The rotation of the headlights is in the horizontal plane.

U.S. Pat. No. 1,666,856 (Holliday) discloses apparatus for moving headlights in the horizontal plane and for tilting the headlights. The movement of the headlights in the horizontal plane is by a chain drive system connected to the steering column. The tilting of the headlights is accomplished hydraulically and is controlled by a lever fastened to the steering column.

U.S. Pat. No. 1,697,242 (Hill) discloses a gear drive system for rotating headlights both horizontally and vertically. The gear system is tied mechanically through levers adjacent to the drive. One lever is connected to the gears for rotating the headlights vertically and a second lever system is connected to the gears for rotating the headlights horizontally.

U.S. Pat. No. 2,603,898 (Patterson, Jr.) discloses a lighted letter sign in which the letters rotate. The sign and elements are rotated by a shaft and gear arrangement.

U.S. Pat. No. 4,240,062 (Gosswiller) discloses a flashing light system for the roof lights of emergency vehicles and the like. The lights are rotated by means of a gear train.

U.S. Pat. No. 4,626,966 (Bleiwas et al) discloses a flashing lamp system in which the lamps are rotated through a chain and gear drive system. A timing chain couples the various elements together to provide a constant angular relationship between the lenses of the lamps.

U.S. Pat. No. 4,692,845 (Widhalm et al) discloses a pair of lights secured to the roll bar of a vehicle. The lights pivot through a one-hundred-eighty degree arc by means of a pair of tension springs.

U.S. Pat. No. 4,707,014 (Rich) discloses a streamlined or enclosed light bar system in which the lights are nested within a streamlined light bar. The lights pivot upwardly to an operative position from their nested position by an electrical motor and gear system.

SUMMARY OF THE INVENTION

The invention described and claimed herein comprises a light bar secured to the cab of a vehicle which includes support structures at opposite ends of the bar, and a plurality of lights is illustratively shown as secured to the exterior of the bar. Within the bar are various elements, including elements, for coupling the plurality of lights together for joint rotation about an axis substantially perpendicularly to the longitudinal axis of the bar. The bar or housing itself is rotatable in the vertical plane through another drive system.

Among the objects of the present invention are the following:

To provide new and useful light bar apparatus for a vehicle;

To provide new and useful light apparatus for a vehicle in which the lights rotate substantially simultaneously;

To provide new and useful light bar apparatus in which a plurality of lights is secured to a light bar, and the lights rotate relative to the light bar;

To provide new and useful light bar apparatus in which a plurality of lights is secured to a light bar, and the light bar rotates in the vertical plane; and To provide new and useful chain drive apparatus for moving a light bar in the vertical plane and a chain drive system disposed within a light bar for rotating a plurality of lights secured to the light bar.

BRIEF DESCRIPTION OF THE DRAWING

FIG. 1 is a perspective view of the apparatus of the present invention.

FIG. 2 is a view in partial section taken generally along line 2—2 of FIG. 1.

FIG. 3 is a view in partial section taken generally along line 3—3 of FIG. 1.

FIG. 4 is a view in partial section taken generally along line 4—4 of FIG. 3.

FIG. 5 is an enlarged view in partial section taken generally from Circle 5 of FIG. 2.

DESCRIPTION OF THE PREFERRED EMBODIMENT

Figure 6:
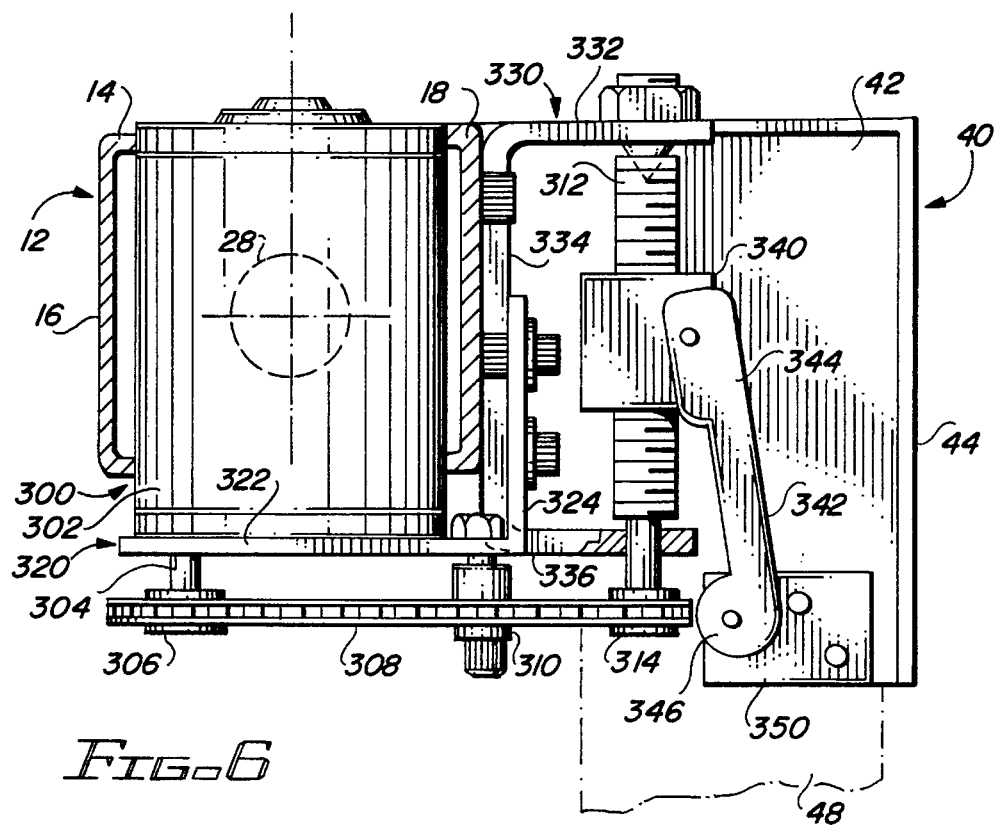
FIG. 6 is an enlarged view in partial section taken generally along line 6—6 of FIG. 2.

FIG. 1 has a perspective view of a adjustable light bar apparatus 10 of the present invention. The adjustable light bar apparatus includes a light bar housing 12 and four light assemblies secured to the top of the light bar housing 12. The light assemblies include a light assembly 70, a light assembly 110, a light assembly 150, and a light assembly 190.

The light bar housing 12 is supported on opposite ends by a pair of end support units, including an end support unit 30 and an end support unit 40. The end support unit 40 includes elements discussed in detail below, including a block 46. The end support unit 30 is secured to a post 32, and post 32 is in turned secured to the vehicle on which the apparatus 10 is disposed.

The end support unit 40 includes a plate 42, a plate 44, and the support block 46. The support block 46 is secured to the plate 42. The end support unit 40 is secured to a vertically extending post 48. The post 48 is generally parallel to the post 32, and is appropriately secured to the vehicle on which the apparatus 10 is disposed.

FIG. 2 is a view in partial section to the light bar housing 12 taken generally along line 2—2 of FIG. 1. FIG. 3 is a view in partial section taken generally along line 3—3 of FIG. 1, and generally through the light assembly 110 and the light bar housing 12. FIG. 4 is a view in partial section taken generally along line 4—4 of FIG. 3. For the following discussion, reference will primarily be made to FIGS. 1, 2, 3, and 4.

The light bar housing 12 includes a top side 14, a front side 16, a rear side 18, and a bottom portion 20. An open slot 21 extends through the bottom portion 20 generally axially aligned with the longitudinal axis of the housing 12.

At opposite ends of the light bar housing 12 are two blocks, an end block 22 and an end block 26. A shaft 24 is appropriately secured in the end block 22, and extends between the light bar housing 12 and the end support unit 40 the end block 26 is secured to the housing 12 at the opposite end of the housing from the end block 22. A shaft 28 is appropriately secured to the end block 26. The shaft 28 extends to the support block 46. The shafts 24 and 28 are appropriately journaled for rotation in the support blocks in the end support units.

The shafts 24 and 28 allow the light bar housing 12, with its light bar assemblies 70, 110, 150, and 190 secured thereto to pivot or rotate along the longitudinal axis of the housing 12. The conditional axis of the housing 12 is along the axis of the shafts 24 and 28. The tilting or pivoting of the light bar housing 12 will be discussed in more detail below, primarily in conjunction with FIGS. 5, 6, and 7.

As best shown in FIG. 4, an angle bracket 60 is secured within the light bar housing 12 by a plurality of screws 66. The screws 66 are shown in FIG. 1. The angle bracket 60, which may comprise simply a length of angle iron, includes a vertical flange 62 and a horizontal flange 64. The vertical flange 62 is a appropriately secured to the rear wall 18 of the housing 12, and the horizontal flange is appropriately secured to the top side 14 of the housing 12 by the plurality of screws 66 (See FIG. 1). The bracket 60 provides strength for the housing, and the four light assemblies 70 . . . 190 are secured to the housing 12 through the bracket 60.

The four light assemblies 70 . . . 190 are substantially identical. The light assembly 70 includes an outer or top bracket 72 which is secured to the light bar housing 12 and to the horizontal flange 64 of the bracket 60. The bracket 72 includes a curved top wall 73 in which there is a slot 74. The bracket 72 also includes a bottom wall 76, and a pair of end walls or side walls which extend to the top wall 73 and the bottom wall 76.

Secured to the top wall 73 is a light base 78. Above the light base 78 is a light fixture 86. The light fixture 86, through its light base 78, is secured to the slot 74 in the top wall 73. The light fixture 86, through its light base 78, is adjustable in the slot 74 so that it may be aimed in a particular manner, as desired by the user of the apparatus 10.

As best shown in FIG. 2, the light assembly 70 includes a rotatable shaft 98, and a sprocket 100 is secured to the shaft 98. Rotation of the sprocket 100, by a chain 230, causes the sprocket 100, and the shaft 98 to rotate. The shaft 98 is in turn secured to the bracket 72, and the light fixture 86 is secured to the bracket 72, and accordingly the shaft 98, the bracket 72, and the light fixture 86 rotate together.

An electrical conduit 104 is shown in FIG. 1 extending between the bracket 72 and the light fixture 86.

The light assembly 110 is substantially identical to the light assembly 70. The light assembly 110 will be discussed in detail in conjunction with FIGS. 1, 2, 3, and 4.

The light assembly 110 includes an outer or top bracket 112, and the bracket 112 includes a curved top wall 113 and a generally flat or planar bottom wall 116. A slot 114 extends through the curved top wall 113. The slot 114 is arcuate in extent since it follows the curvature of the top wall 113.

The bottom wall 116 is generally flat or horizontal, and is generally parallel to the top wall or side 14 of the light bar housing 12. As best shown in FIGS. 3 and 4, the bottom wall 116, and accordingly the bracket 112, is spaced apart slightly upwardly from the top wall 14 and accordingly from the light bar housing 12.

A light base 118 is appropriately secured to a threaded stud 120. The threaded stud 120 extends through the slot 114 and is secured to the bracket 112 in the curved slot 114 by a curved washer 122 and a nut 124. In FIGS. 3 and 4, a flat washer is shown disposed between the nut 124 and the curved washer 122. The curved washer 122 is curved the same extent as the top wall 113 so as to enable the light base 118, and a light fixture 126 secured thereto, to be appropriately secured to the bracket 112.

By the large arrows in FIG. 4, the arcuate placement or adjustment of the light fixture 126 relative to the bracket 112 and to the light bar housing 12 is illustrated. By merely loosening the nut 124, the light 126, through its base 118 and the threaded stud 120 and the washer 122, may be positioned as desired in the arcuately extending slot 114 to give a placement or location to a predetermined aiming point for the light fixture 126.

As best shown in FIGS. 3 and 4, there is an upper bearing assembly 128 secured to horizontal flange 64 of the angle bracket 60. Extending through the upper bearing assembly 128 is an upper shaft 130. The upper shaft 130 extends also through an aperture in the flange 64 and through a mating or aligned aperture in the upper side 14 of the light bar housing 12. The shaft 130 is secured to the bottom wall 116 of the bracket 112 by a screw 131.

There is a slot 132 that extends vertically on the outer periphery of the shaft 130. The purpose of the slot 132 is to receive an electrical conductor 276. The conductor 276 will be discussed in detail below.

Secured to the lower portion of the shaft 130 beneath the bearing assembly 128 is a drum commutator 134. The drum commutator 134 is secured to the shaft 130 through a dielectric base 136. The commutator 134 is, of course, conductive. The drum commutator 134 will be discussed in detail below.

Extending beneath the commutator 134 is a lower shaft portion 138. A sprocket 140 is secured to the shaft 138 beneath the commutator 134.

The bottom end of the shaft 138 is disposed in a lower bearing box assembly 142. The bearing box assembly 142 is secured to the bottom 20 of the light bar housing 12.

The chain 230 is disposed about the sprocket 140. Movement of the chain 230 causes movement of the sprocket 140, and there is a resulting movement of the shafts 138 and 130 to cause rotation of the bracket 112 and the light fixture 126.

An electrical conduit 144 extends between the bracket 112 and the light fixture 126. The conductor 276, which is electrically connected to the drum commutator 134, is disposed in the slot 132 and extends through the conduit 144 to the light fixture 126.

The light assembly 190 is substantially identical to the light assembly 110, and the light assembly 190 is substantially identical to the light assembly 70 and also to the light assembly 150.

The light assembly 150 includes an outer bracket 152, and the outer bracket 152 includes a curved top wall 153 in which extends a curved slot 154. The bracket 152 also includes a bottom wall 156. A light base 158, to which is secured a light fixture 166, is appropriately secured to the bracket 152 in the slot 154.

In FIG. 2, there is shown a lower shaft 178 to which is secured a sprocket 180. The shaft 178 is the bottom portion of a shaft assembly which is appropriately secured to the bracket 152 for rotation of the bracket 152 and the light fixture 166 secured thereto. The chain 230 extends about the sprocket 180 so that a light fixture 166 moves in concert with the light fixtures 126 and 86, as discussed above.

An electrical conduit 184 extends between the bracket 152 and the light fixture 166. The conduit 184, like the conduits 144 and 104, comprises a housing in which is disposed electrical conductors for the lamp elements within the light fixture 166.

The light assembly 190 is, again, substantially identical to the light assemblies 150, 110, and 70. The light assembly 190 includes an outer or top bracket 192. The bracket 192 includes a curved top wall 193 and a bottom wall 196. There is a slot 194 extending through the top wall 193. The slot 194 is curved, or arcuate, in configuration. A light base 198, to which is secured a light fixture 206, is secured to the bracket 192 in the slot 194. By positioning the base 198, and the fixture 206, in the slot 194 relative to the top wall 193, the fixture 206 may be appropriately adjusted or aimed.

In FIG. 1, there are shown two curved arrows, one arcuately extending to illustrate the movement of the light fixture 206 relative to the bracket 192, and the other a generally circular double headed arrow illustrating the rotation of the light fixture 206 through its bracket 192 by virtue of movement of the chain 230. The chain 230 is in turn disposed about a drive sprocket 220 which is secured to a shaft 218. The sprocket 220 and the shaft 218 are shown in FIG. 2. The shaft 218 is ultimately secured to the bracket 192.

Also shown in FIG. 2 are a number of arcuately extending parallel arrows with heads pointing in opposite directions. The arrows illustrate the rotational movement of the light assemblies 70 . . . 190 relative to the light bar housing 12 by the movement of the chain 230. Other oppositely extending arrows illustrate the movement of the chain 230.

In addition to the drive sprockets 100, 140, 180, and 220, secured respectively to the lower shafts 98, 138, 178, and 218, there are four tensioning sprockets which appropriately mesh with the chain 230. The tensioning sprockets include a sprocket 232, a sprocket 234, a sprocket 236, and a sprocket 238. The purpose of the tensioning sprockets is well known and understood.

The chain 230 moves in response to rotation of a shaft 252 of a drive motor 250. A sprocket 254 is secured to the shaft 252. The motor 250 is a reversible motor and is thus able to move the light assemblies 70 . . . 190 in either direction, to position the light fixtures 86, 126, 166, and 206 as desired. All of the light assemblies 70 . . . 190 move together, or jointly, in response to the motor 250.

Movement of the light, assemblies 70 . . . 190 is generally in parallel or in concert. That is, when one of the light assemblies rotate, the other three also rotate. However, it will be understood that the light assemblies may be independently positioned not only in their slots, and thus arcuately with respect to their brackets, but the light assemblies may also be adjusted sideways so that there may be a common aiming point, or a diverse aiming point for each light fixture. However, regardless of the orientation of a particular light fixture, the rotation of the lights will be substantially simultaneous and in concert due to the chain and sprocket drive system employed.

Returning again to FIGS. 3 and 4, the electrical system for providing power to the lamps within the light fixtures is illustrated in conjunction with the light assembly 110. As previously mentioned, the drum commutator 134 is disposed about the shaft 130 and is secured to a dielectric base plate 136. The base plate 136 is in turn secured to the shaft 130. A brush 270 is shown in FIG. 3 extending from a brush housing 272 to the drum commutator 134. A positive conductor 274 is schematically illustrated as secured to the brush housing 272. A brush 270 extends from the brush housing 272 to a drum commutator 134. The conductor 276 extends from the commutator 134 to the light fixture 126.

The conductor 276 is disposed within the slot 132 in the shaft 130 and it extends through an aperture or hole in the bottom wall 116 of the bracket 112. The conductor 276 then extends into the interior of the bracket 112 and into the electrical conduit 144. The positive conductor 276 is thus electrically connected to the conductor 274 and to the lamp within the light fixture 126. The conductor 274 in turn extends to the electrical system of the vehicle in which the light bar apparatus 10 is secured.

A ground conductor 278 is shown in FIG. 3 extending from the screw 131 of the bracket 112 and the shaft 130 to the conduit 144. The ground conductor 278 extends to the lamp within the light fixture 126 to complete the electrical circuitry for the lamp within the light fixture 126.

The brush 270 and the brush housing 272 are fixed in place within the light bar housing 12. The drum commutator 134 and the shaft 130, with its slot 132 and with the conductor 276 disposed therein, rotate in response to movement of the chain 230. The bracket 112 and the light housing 126, along with the commutator 134 all move as a unit. Electrical contact is maintained between the brush 270 and the drum commutator 134 to provide appropriate electrical energy or electrical power for the lamp within the light fixture 126.

Electrical power to the motor 250 is, of course, independent of the electrical power to the lamps within their respective light fixtures. While the light fixtures, and their brackets, etc., rotate, the motor 250 is fixed relative to the light bar housing 12. Accordingly, electrical conductors, not shown, may extend directly to the motor 250 from a appropriate power source and control switch, not shown.

It will be understood that the electrical systems of the other light assemblies are substantially identical to the electrical system illustrated in FIGS. 3 and 4 for the light assembly 110.

The tilting of the light bar housing 12 relative to the end support units 30 and 40 has been briefly mentioned above. The tilting of the light bar housing 12, and accordingly the tilting of the light assemblies 70 . . . 190 secured to the light bar assembly 12, is illustrated in conjunction with FIGS. 5, 6, and 7.

FIG. 5 is an enlarged view in partial section taken generally from circle 5 of FIG. 2, comprising a bottom view of the mechanical linkage which rotates the light bar housing 12 on its longitudinal axis, which comprises the axis through the shafts 24 and 28.

Figure 7:
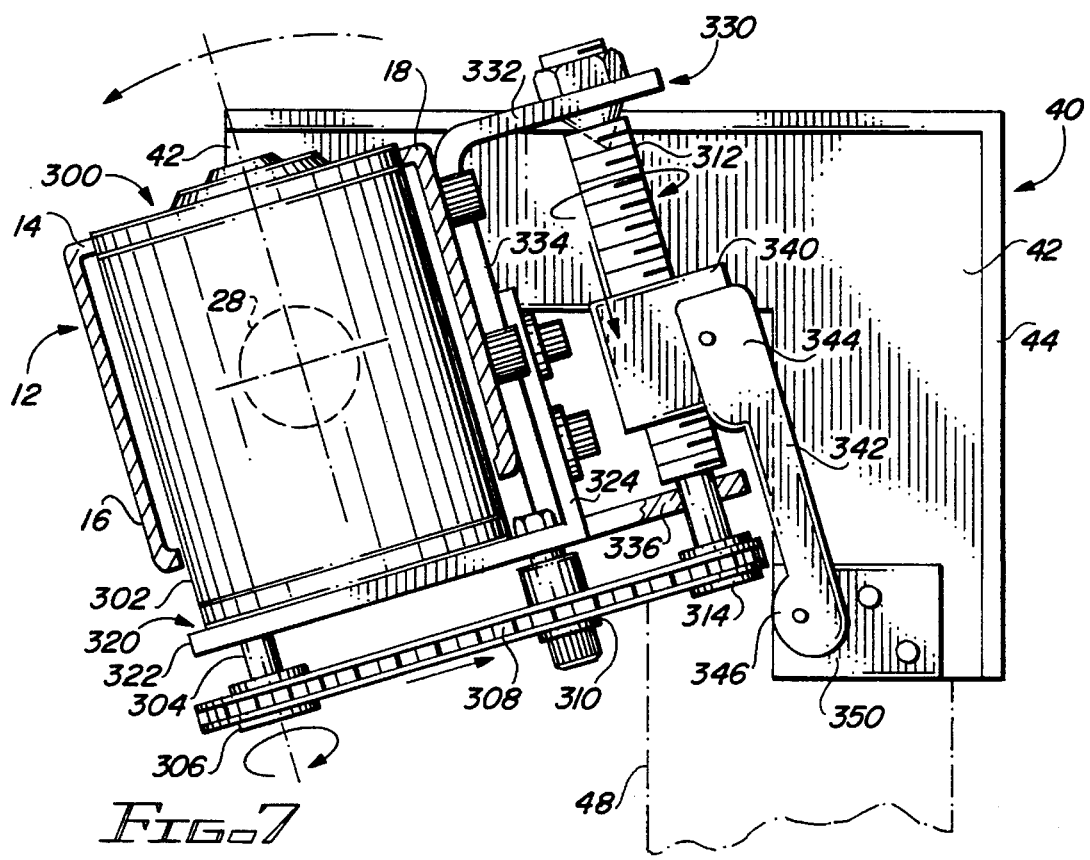
FIG. 7 is a view in partial section sequentially illustrating the operation of the apparatus of FIG. 6.

FIG. 6 is a view in partial section showing the details of the mechanical linkage of the tilting system, and FIG. 7 is a view in partial section sequentially illustrating the mechanical movement of the elements of FIG. 6.

The light bar apparatus 10 includes a tilt system 300 disposed at one end of the light bar housing 12. The tilt system or tilt assembly 300 includes a reversible motor 302 secured through a bracket 320 to the light bar housing 12.

The bracket 320 includes a pair of arms, a bottom generally horizontally extending arm 322 and a side, or generally vertically extending, arm 324. The motor 302 is disposed generally within the light bar housing 12. The motor 302 includes an output shaft 304, and there is a sprocket 306 on the bottom end of the shaft 304.

A drive chain 308 is disposed about the sprocket 306 and about an idler sprocket 310 and about a sprocket 314 on the bottom end of a threaded shaft 312.

The threaded shaft 312 is supported on a bracket 330. The bracket 330 is a generally U-shaped bracket which is appropriately secured to both the bracket 320 and to side 18 of the light bar housing 12.

The bracket 330 includes a pair of generally horizontally extending arms 332 and 336 and a generally vertically extending arm 334. The arm 334 extends between the arms 332 and 336. The bracket 320, or the arm 324 of the bracket 320, is secured adjacent to the arm 334 of the bracket 330, and both the arms 324 and 334 are appropriately secured to the side 18 of the housing 12.

A follower nut 340 is movable on the threaded shaft 312 in response to rotation of the drive shaft 304 of the motor 302. As the threaded shaft 312 rotates, the follower nut 340 moves upwardly and downwardly on the shaft 312.

A link 342 is appropriately pinned to both the follower nut 340 and to an anchor block 350. The anchor block 350 is secured to the end plate 42 of the end support unit 40. The link 342 includes an upper portion 344 and an lower portion 346. The upper portion 344 is pinned to the nut 340, and the lower portion 346 is pinned to the anchor block 350.

The link 342 comprises the pivoting element which causes the tilt assembly 300 to tilt the housing 12, and the light assembly secured thereto, in response to rotation of the shaft 304 of the motor 302. With the plate 42 fixed, and the anchor block 350 also fixed, rotation of the threaded shaft 312 in response to the motor 302 causes the nut 340 to move vertically upwardly or downwardly relative to the threaded shaft 312 and there is a tilt movement or tilting movement of the light bar housing 12 in response thereto. The light bar housing 12 pivots on its longitudinal axis on the shafts 24 and 28, as discussed above. The end shaft 28 is shown in dotted line in FIGS. 6 and 7.

As the nut 340 moves downwardly on the shaft 312 in response to rotation of the shaft 312, the pivoting link 342 forces the counterclockwise pivoting of the housing 12, as shown in FIG. 7. Since the end 346 of the link 342 is pivotly secured to the fixed block 350, the upper end 344 of the link 342 must maintain its same or fixed radius relative to the fixed block 350. In order to accomplish that function, the nut must move relative to the threaded shaft 312, and that is accomplished by the pivoting of the housing 12 relative to the fixed block 350 as the nut 340 moves towards the bottom of the threaded shaft 312. This is shown in FIG. 7 by the large curved arrow, indicating the pivoting movement.

When the reversible gear motor 302 causes the shaft 304 to rotate in the opposite direction from that shown in FIG. 7, the threaded shaft 312 also rotates oppositely to that shown in FIG. 7. The nut 340 then moves up on the shaft 312. Again, the link 342 causes a pivoting movement of the housing 12 to move the housing 12, and the light assemblies secured thereto, to the position shown in FIG. 6.

It is obvious that continued rotation of the shafts 304 and 312 in the same direction will cause the housing 12 to continue pivoting.

The length of the threaded shaft 312, the axial length of the nut 340, and the length of the link 342 are essentially the limiting factors for the tilting of the housing 12 and the light assemblies. As a practical matter, a tilt through an angular distance of about thirty degrees appears to be sufficient, with an angular movement of about fifteen degrees or so of "down" pivoting and about fifteen degrees or so of "up" pivoting. This may vary, of course, within practical and desirable limits.

While the principles of the invention have been made clear in illustrative embodiments, there will be immediately obvious to those skilled in the art many modifications of structure, arrangement, proportions, the elements, material, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What is claim is:

1. Adjustable light bar apparatus for a vehicle comprising in combination:

light fixture means for providing light;

bracket means for supporting the light fixture means;

light bar housing means secured to the bracket means for supporting the bracket means and pivotable for pivoting the light fixture means; and means for pivoting the light bar housing means, including
   a motor secured to the light bar housing means,
   a threaded shaft secured to the light bar housing means and rotatably coupled to the motor,
   a nut movable on the threaded shaft in response to the rotation of the threaded shaft,
   a block secured to the vehicle, and
   a link having a first end secured to the nut and a second end secured to the block and pivotable relative to both the block and the nut whereby movement of the nut on the threaded shaft causes pivoting of the threaded shaft and the light bar housing means.

2. The apparatus of claim 1 in which the bracket means includes a slot, and the light fixture means is movable in the slot to position the light fixture relative to the bracket means.

3. The apparatus of claim 2 in which the light bar means includes means for rotating the bracket means and the light fixture means.

4. The apparatus of claim 3 in which the means for rotating the bracket means and the light fixture means includes shaft means secured to the light bar housing means and coupled to the bracket means, and motor means coupled to the shaft means for rotating the shaft means, the bracket means, and the light fixture means.

5. The apparatus of claim 4 in which the motor means includes an output shaft and a chain coupling the output shaft to the shaft means.

6. The apparatus of claim 1 in which the light fixture means includes a plurality of light fixtures, and the bracket means includes a plurality of brackets, with one bracket of the plurality of brackets secured to one light fixture of the plurality of light fixtures.

7. The apparatus of claim 6 in which each bracket includes a slot, and a light fixture is adjustable in the slot independently of the other light fixtures and their respective slots and brackets.

8. The apparatus of claim 7 in which light bar housing means includes means for rotating the bracket means to rotate the light fixtures secured to the brackets of the bracket means.

9. The apparatus of claim 8 in which the means for rotating the bracket means includes
- a shaft connected to each bracket,
- a sprocket connected to each shaft,
- a motor having an output shaft,
- a drive sprocket connected to the output shaft, and
- a chain connected to the drive sprocket and to the sprockets on the shafts of the brackets, and rotation of the output shaft of the motor causes rotation of the light fixtures secured to the brackets through the chain and the sprockets secured to the shafts of the brackets.

10. The apparatus of claim 1 in which the light bar housing means includes
- a light bar housing to which the bracket means is secured,
- support means for supporting the light bar housing,
- shaft means secured to the light bar housing and the support means, and
- the means for pivoting the light bar housing means pivots the light bar housing on the shaft means.

* * * * *